United States Patent
Chien

(10) Patent No.: US 8,909,531 B2
(45) Date of Patent: Dec. 9, 2014

(54) METHODS AND DEVICES FOR DISPLAYING MULTIMEDIA DATA EMULATING EMOTIONS BASED ON IMAGE SHUTTERING SPEED

(75) Inventor: Min-Hung Chien, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 1345 days.

(21) Appl. No.: 12/572,384

(22) Filed: Oct. 2, 2009

(65) Prior Publication Data

US 2011/0081101 A1    Apr. 7, 2011

(51) Int. Cl.
  *G10L 21/00*    (2013.01)
  *G06F 3/00*    (2006.01)
  *G11B 19/02*    (2006.01)
  *G10L 15/22*    (2006.01)
  *H04N 5/445*    (2011.01)

(52) U.S. Cl.
  CPC .............. *G11B 19/025* (2013.01); *G10L 15/22* (2013.01); *H04N 5/44543* (2013.01)
  USPC .......................................... 704/270; 715/716

(58) Field of Classification Search
  CPC ............................ G10L 15/22; H04N 5/44543
  USPC ........................................................ 704/229
  See application file for complete search history.

(56) References Cited

U.S. PATENT DOCUMENTS 6,226,608 B1 * 5/2001 Fielder et al. .................. 704/229
2004/0027369 A1 * 2/2004 Kellock et al. ................ 345/716

* cited by examiner

*Primary Examiner* — Farzad Kazeminezhad
(74) *Attorney, Agent, or Firm* — McClure, Qualey & Rodack, LLP

(57) ABSTRACT

A method and a device for displaying multimedia data are provided. According to the method, the device can operate in a music priority mode and a picture priority mode to simultaneously play music and display pictures according to human emotional feelings. Analyzing pictures to obtain at least one feature value which comprises of a shutter speed value. In the music priority mode, a display effect and a display speed for displaying pictures matches with a played type of music. In the picture priority mode, a display effect and a display speed for displaying pictures match with picture content, and a played type of music matching with the picture content is selected and played while the pictures are being displayed.

12 Claims, 5 Drawing Sheets

METHODS AND DEVICES FOR DISPLAYING MULTIMEDIA DATA EMULATING EMOTIONS BASED ON IMAGE SHUTTERING SPEED

BACKGROUND

1. Technical Field

The disclosed embodiments relate to methods for displaying multimedia data, and more particularly to devices for displaying multimedia data which can play music and display pictures by emotional type modes.

2. Description of the Related Art

With the development of artificial intelligence, applications in consumer electronic products are being demanded. However, media players for playing music and displaying pictures do not provide sufficient artificial intelligence-like functions, such that emotional type mode functions may not sufficiently match user requirements. Thus, manual operation may be required for setting an emotional type mode, such as setting a display effect and a display speed for a picture to be played, to match with a type of music.

Thus, it is desired to provide a method and device for displaying multimedia data, which can play music and display pictures simultaneously according to an emotional type mode without manual operation.

BRIEF SUMMARY OF THE INVENTION

An exemplary embodiment of method for displaying multimedia data is provided, comprising the steps of: providing an audio bitstream and at least one picture; analyzing the audio bitstream to obtain at least one feature value thereof; determining a playback model from a plurality of playback models to play the audio bitstream therewith according to the at least one feature value of the audio bitstream; playing the audio bitstream; and displaying the at least one picture according to the determined playback model while the audio bitstream is being played.

Another exemplary embodiment of method for displaying multimedia data is provided, comprising the steps of: providing a plurality of pictures and a plurality of different types of music; analyzing at least one of the pictures to obtain at least one feature value thereof; determining a playback model among a plurality of play models to display at least one of the pictures according to the at least one feature value of at least one of the pictures; selecting one type of music among the different types of music according to the determined playback model; playing the selected type of music; and displaying the at least one of the pictures according the determined playback model while the selected type of music is being played.

An exemplary embodiment of a device for displaying multimedia data according to a plurality of playback models is provided. The device comprises a first memory, a second memory, a processing module, a determination module, a music playing module, and a display module. The first memory stores a plurality of audio bitstreams. The second memory stores a group of pictures. The processing module receives and analyzes one of the audio bitstreams in a music priority mode or at least one picture of the group of pictures in a picture priority mode to generate at least one feature value. The determination module receives the at least one feature value and determines one of the playback models to play the analyzed audio bitstream in the music priority therewith or display the analyzed picture in the picture priority mode therewith according to the at least one feature value. The determination module further generates a first indication signal and a second indication signal according to the determined playback model. The music playing module plays one of the audio bitstreams in the music priority mode according to the first indication signal or plays one type of audio bitstreams in the picture priority mode according to the first indication signal. The display module displays the group of pictures in the music priority mode according to the second indication signal and displays the at least one picture of the group of pictures in the picture priority mode according to the second indication signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
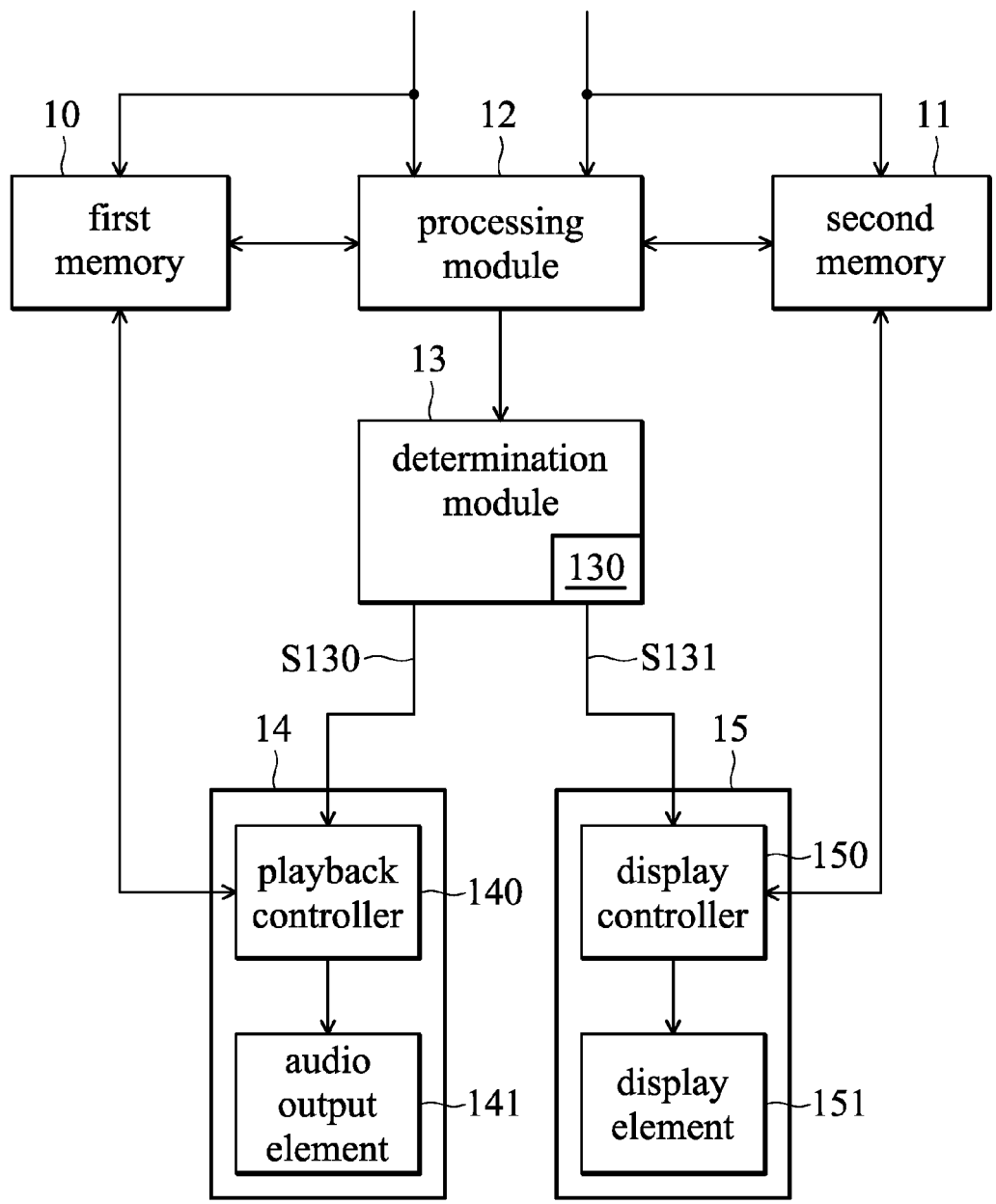
FIG. 1 is an exemplary embodiment of a device for displaying multimedia data.

The following description is of the best-contemplated mode of carrying out the invention. This description is made for the purpose of illustrating the general principles of the invention and should not be taken in a limiting sense. The scope of the invention is best determined by reference to the appended claims.

Devices for displaying multimedia data according to a plurality of playback models are provided. In an exemplary embodiment of a device for displaying multimedia data in FIG. 1, a device 1 for displaying multimedia data comprises memories 10 and 11, a processing module 12, a determination module 13, a music playing module 14, and a display module 15. The device 1 can either operate by a music priority mode or a picture priority mode to simultaneously play music and display pictures. Each of the music priority mode and the picture priority mode comprises at least one playback model. The memory 10 is used to store a plurality audio bitstreams which may be input from an external device when the device 1 is operating, or input previously for storage. In the embodiment, one audio bitstream corresponds to a piece of music or several successive audio bitstreams forms one piece of music. The memory 11 is used to store a plurality of pictures which either are input from an external device when the device 1 is operating, or input previously for storage. The processing module 12 can access audio bitstreams which is input from the memory 10 or an external device according to the operation of the music priority mode and access pictures either from the memory 11 or from an external device according to the operation the picture priority mode. It is noted that the memories 10 and 11 are for illustrative purposes only, and is not meant to be a limitation of the present invention. That is the memories 10 and 11 may be implemented in the same memory; any storage devices capable of storing the plurality of audio bitstreams and pictures obeys the spirit of the invention.

The music playing module 14 comprises a playback controller 140 and an audio output element 141 controlled by the playback controller 140, such as speaker, line-out jacks and headphones. The display module 15 comprises a display controller 150 and a display element 151 controlled by the display controller 150, such as panels and liquid crystal display (LCD).

In the following, the operation of the device 1 in the music priority mode and the picture priority mode is described according to FIG. 1 and corresponding flow charts.

Figure 2:
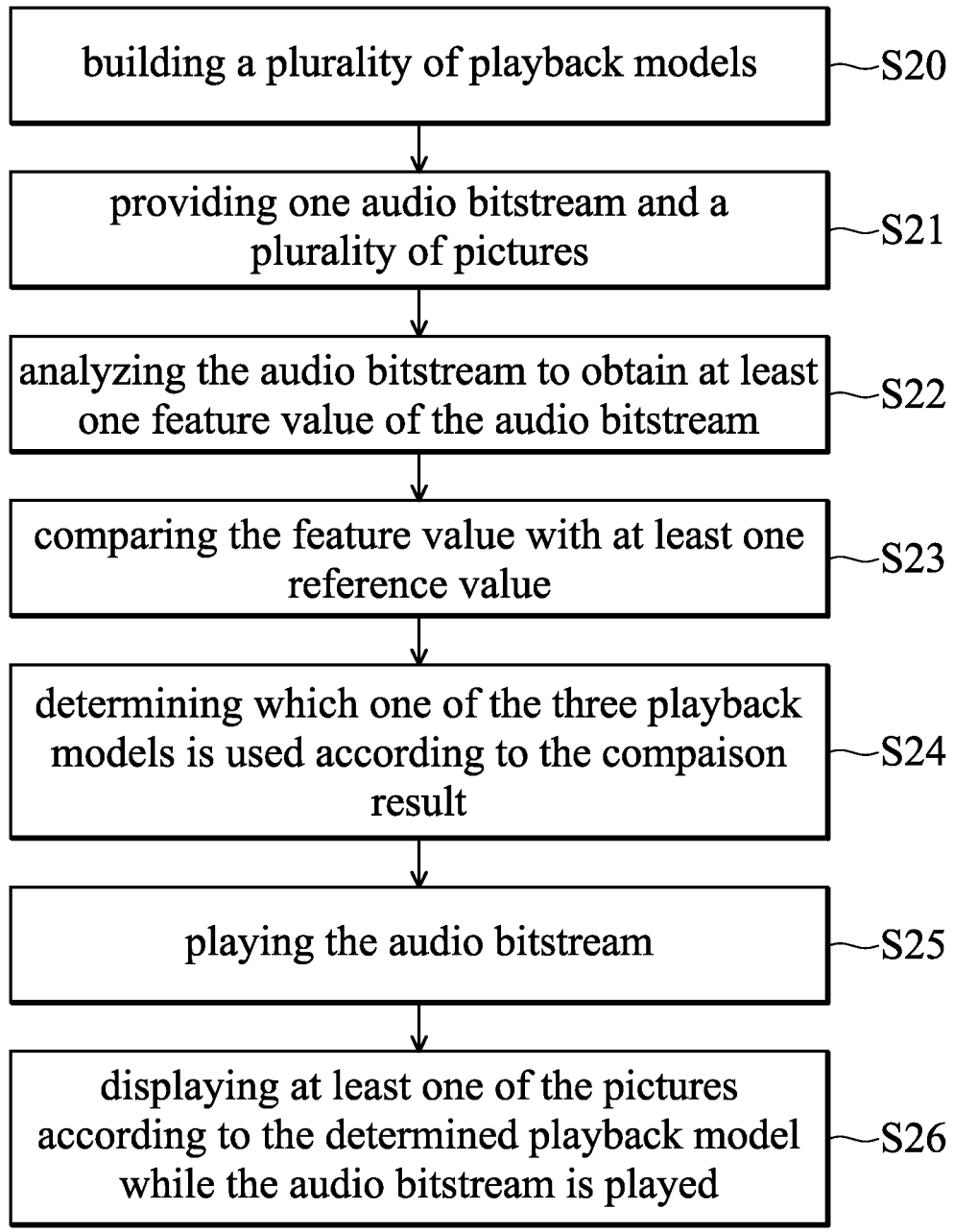
FIG. 2 is a flow chart of a an exemplary embodiment of a method for displaying multimedia data.
Figure 3:
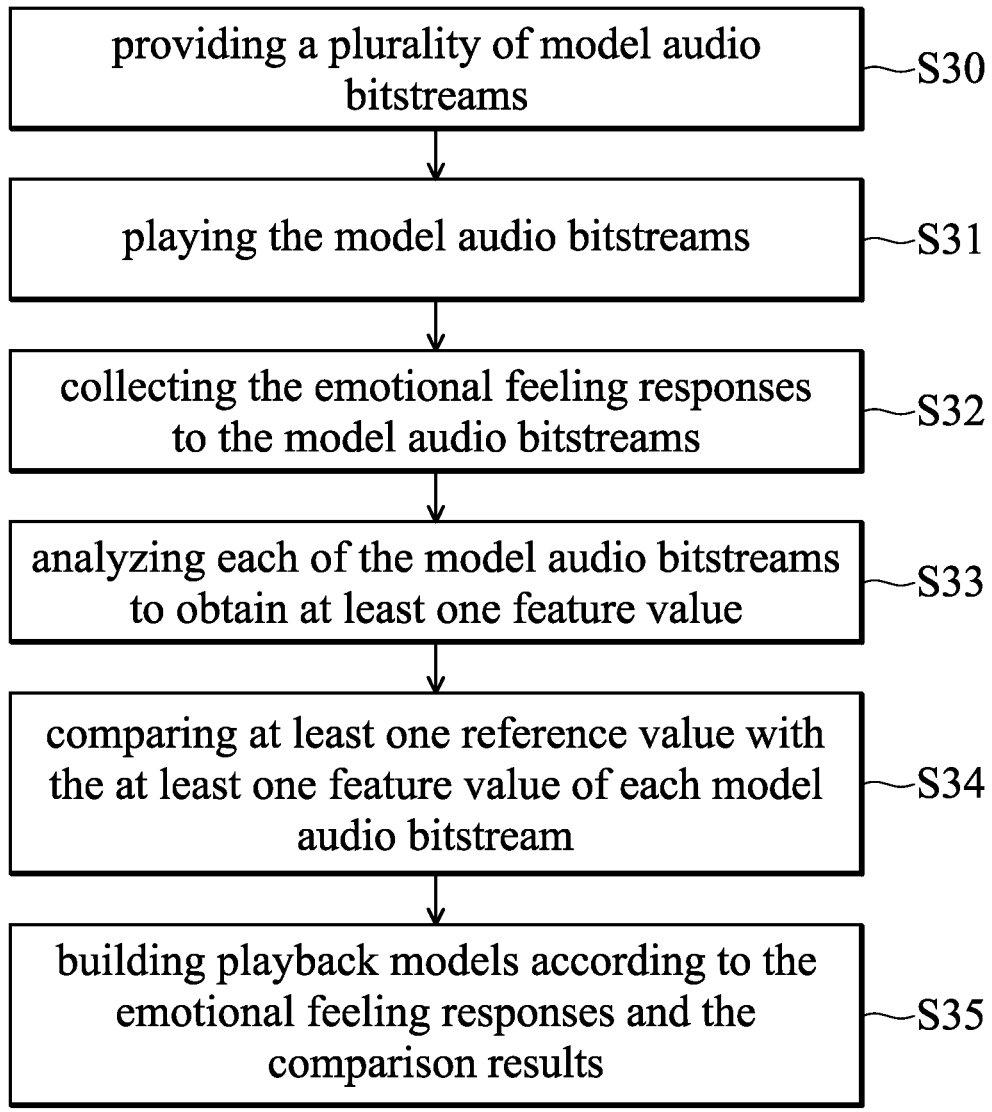
FIG. 3 is a flow chart of an exemplary embodiment of the step for building playback models in the method of FIG. 2.

FIG. 2 is a flow chart of an exemplary embodiment of the operation of the device 1 in the music priority mode. Referring to FIG. 2, a plurality of playback models are built and the information of the playback models is recorded in a table 130 of the determination module 13 (step S20). FIG. 3 is a flow chart of an exemplary embodiment of the step S20 in the method of FIG. 2. Referring to FIG. 3, a plurality of model audio bitstreams are provided and collected (step S30), and the model audio bitstreams are played to listeners (step S31). The listeners then listen to each model audio bitstream and determine their emotional feelings to each type of the model audio bitstreams. The emotional feeling responses of the listeners are then collected (step S32). Each of the model audio bitstreams is analyzed to obtain at least one feature value (step S33). In the embodiment, the at least one feature value may be the frequency variation value and/or the volume variation value of the analyzed model audio bitstream. At least one reference value is then compared with the at least one feature value of each of the model audio bitstreams (step S34). The playback models for the music priority mode are built according to the emotional feeling responses collected in the step S32 and the comparison results generated in the step S34 for simultaneously playing music and displaying pictures (step S35).

Assume that the at least one feature value is the frequency variation value, and two reference values FH and FL are defined in advance, wherein the reference value FH is larger than the reference value FL. One model audio bitstream is played to the listeners. The listeners then determine their emotional feelings to the type of model audio bitstream (step S32), such as rock-and-roll music, romantic music, or general music. The played model audio bitstream is analyzed to obtain its frequency variation value (step S33), and the obtained frequency variation value is compared with the reference values FH and FL (step S34). A sufficient amount of model audio bitstreams are played to the listeners, and the operations of the steps S32, S33, and S35 are performed. By performing a statistics operation and a classification operation to the emotional feeling responses of the listeners and the comparison results of the model audio bitstreams, three playback models for the music priority mode may be built as follows.

The first playback model is: an audio bitstream with a frequency variation value FV larger than the reference value FH is classified as a first type of music, such as rock-and-roll music, and desired pictures are displayed with a predetermined display effect and/or a predetermined display effect corresponding to the first playback model while the audio bitstream is being played, wherein the predetermined display effect in the first playback model is a quick transition effect and the predetermined display effect is a fast display speed, as shown in Table 1.

The second playback model is: an audio bitstream with a frequency variation value FV less than the reference value FL is classified as a second type of music, such as romantic music, and desired pictures are displayed with a predetermined display effect and/or a predetermined display effect corresponding to the second playback model while the audio bitstream is being played, wherein the predetermined display effect in the second playback model is a progressive transition effect and the predetermined display effect is a slow display speed, as shown in Table 1.

The third playback model is: an audio bitstream with a frequency variation value FV larger than the reference value FL and less than the reference value FH is classified as a third type of music such as general music, and desired pictures are displayed with a predetermined display effect and/or a predetermined display effect corresponding to the third playback model while the audio bitstream is being played, wherein the predetermined display effect in the third playback model is a general transition effect between the quick and progressive transition effects and the predetermined display effect is an average display speed between the fast and slow display speed, as shown in Table 1.

TABLE 1 the playback models in the music priority mode

| playback model | frequency variation (FV) | music classification | display effect | display speed |
| --- | --- | --- | --- | --- |
| first | FV > FH | first type of music (e.g. rock-and-roll) | quick transition | fast |
| second | FV < FL | second type of music (e.g. romantic) | progressive transition | slow |
| third | FL < FV < FH | third type of music (e.g. general) | general transition | average |

In some embodiments, the display effect can be a wipe transition effect, a diagonal wipe transition effect, an extend transition effect, a compress transition effect, a window transition effect, or a fade-in transition effect according to determination of the playback models. Table 1 is only an example for illustrative purposes only, and is not meant to be a limitation of the present invention.

Referring to FIGS. 1 and 2, one of audio bitstreams which were previously stored in the memory 10 or one audio bitstream from an external device is provided to the processing module 12. Moreover, there are pictures which were previously stored in the memory 11 or are being provided from an external device (step S21). In this embodiment, the processing module 12 performs a read operation to the memory 10 to receive one of the audio bitstreams stored in the memory 10. The processing module 12 then analyzes the received audio bitstream to obtain at least one feature value of the audio bitstream (step S22). The feature value is provided to the determination module 13. The determination module 13 compares the feature value with at least one reference value stored in the table 130, such as reference values FH and FL. (step S23) and determines the type of the analyzed audio bitstream such as the first, second and third types shown in Table 1, according to the comparison result to further determine which one of the three playback models is used for the analyzed audio bitstream (step S24). The determination module 13 generates indication signals S130 and S131 respectively to the playback controller 140 and the display controller 150 according to the determined playback model. The playback controller 140 reads the audio bitstream which is analyzed by the processing module 12 from the memory 10 and plays the audio bitstream through the audio output element 141 according to the indication signal S130 (step S25). The display controller 150 controls the display element 151 according to the indication signal S131 to adjust the display effect and display speed and read at least one of the pictures from the second memory 11. While the playback controller 140 is playing the audio bitstream through the audio output element 141, the display element 151 displays the at least one picture according to the indication signal S131 corresponding to the determined playback model (step S26). For example, the display element 151 displays the at least one picture with the display effect and the display speed of the determined playback model.

For example, when the frequency variation value of the analyzed audio bitstream is larger than the reference value FH, the determination module 13 determines that the first playback module will be used. The display panel 151 displays at least one picture with the quick transition effect and the fast display speed while the audio bitstream is being played.

According to the embodiment of FIG. 2, when the device 1 operates in the music priority mode to simultaneously play music and display pictures, the display effect and/or display speed for the pictures matches with the type of the audio bitstream. Accordingly, the device 1 can play music and display pictures simultaneously according to human emotional feelings without manual operation.

Moreover, assuming an audio bitstream stored in the memory 10 can be divided into several successive audio clips according to types of music of each audio clips, these audio clips are alternately provided to the processing module 12 to obtain feature values thereof. The determination module 13 then determines the playback models for each audio clip. Accordingly, the display effect and display speed for the pictures vary with the type of music of each audio clips.

Figure 4:
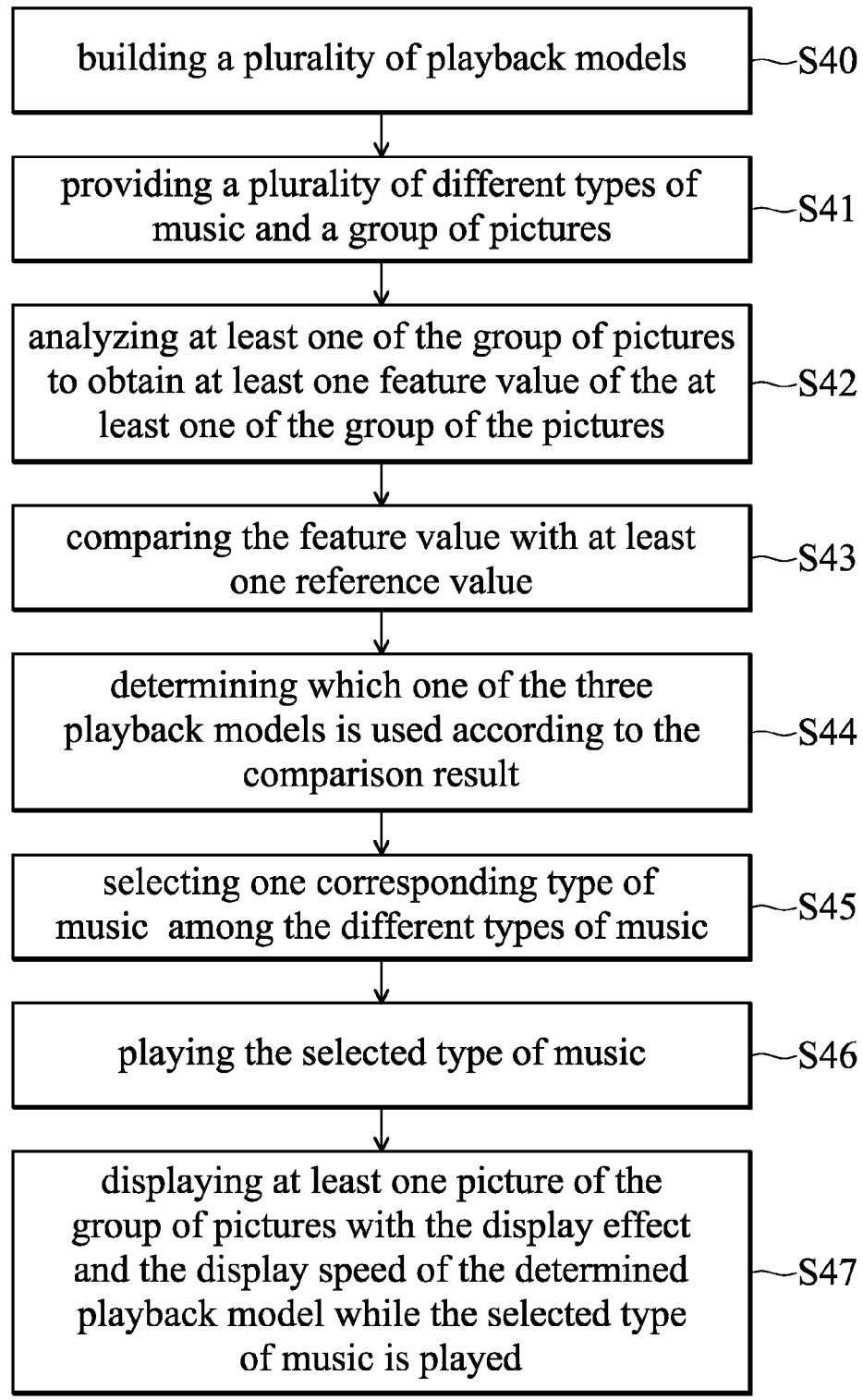
FIG. 4 is a flow chart of a another exemplary embodiment of a method for displaying multimedia data.
Figure 5:
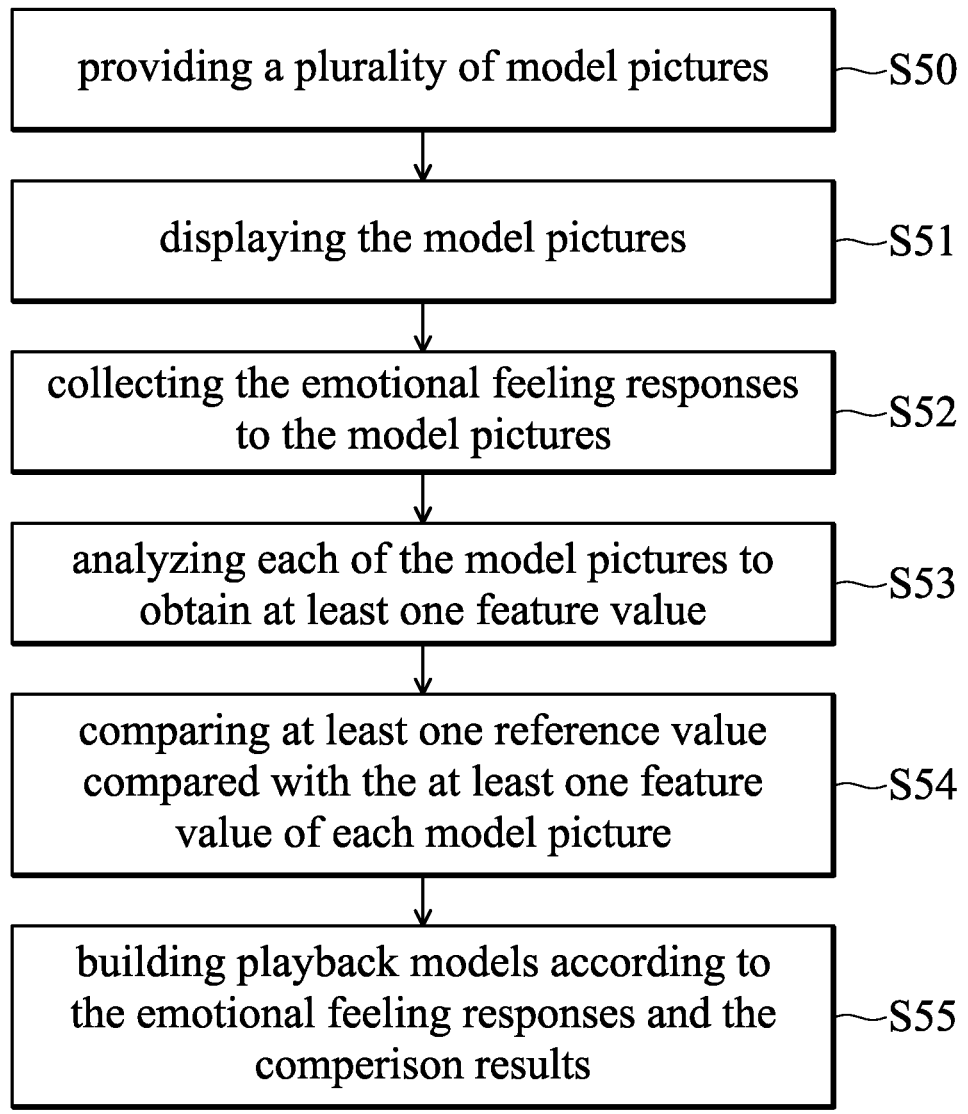
FIG. 5 is a flow chart of an exemplary embodiment of the step for building playback models in the method of FIG. 4.

FIG. 4 is a flow chart of an exemplary embodiment of the operation of the device 1 in the picture priority mode. Referring to FIG. 4, a plurality of playback models are built and the information of the playback models is recorded in a table 130 of the determination module 13 (step S40). FIG. 5 is a flow chart of an exemplary embodiment of the step S40 in the method of FIG. 4. Referring to FIG. 5, a plurality of model pictures are provided (step S50), and the model pictures are displayed to viewers (step S51). The viewers watch each model picture and determine their emotional feelings to the content of each model picture. The emotional feeling responses of the viewers are then collected (step S52). Each of the model pictures is analyzed to obtain at least one feature value (step S53). In the embodiment, the at least one feature value may be at least one of a time when the model picture was taken, a shutter speed value, an aperture value, and an ISO value of the analyzed model picture. At least one reference value is then compared with the at least one feature value of each of the model pictures (step S54). The playback models for the picture priority mode are built according to the emotional feeling responses collected in the step S52 and the comparison results generated in the step S54 for simultaneously playing music and displaying pictures (step S55).

Assume that the at least one feature value is the shutter speed value, and two reference values SH and SL are defined, wherein the reference value SH is larger than the reference value SL. One model picture is displayed to the viewers. The viewers make emotional feeling responses to the content of the model picture (step S52), such as a dynamic picture, a static picture, or a general picture. The displayed model picture is analyzed to obtain its shutter speed value (step S53), and the shutter speed value is compared with the reference values SH and SL (step S54). A sufficient amount of model pictures are displayed to the viewers, and the operations of the steps S52, S53, and S54 are performed. By performing a statistics operation and a classification operation to the emotional feeling responses and the comparison results of the model pictures, three playback models for the picture priority mode may be built as follows.

The first playback model is: a picture among a group of pictures with shutter speed value SV larger than the reference value SH is classified as a first type of pictures, such as dynamic pictures, and the group of pictures is displayed with a predetermined display effect and/or a predetermined display effect corresponding to the first playback model, wherein the predetermined display effect in the first playback model is a quick transition effect and the predetermined display effect is a fast display speed, and a first type of music corresponding to the first playback model, such as rock-and-roll music, is selected and played while the group of pictures is being displayed, as shown in Table 2.

The second playback model is: a picture among a group of pictures with shutter speed value SV less than the reference value SL is classified as a second type of pictures such as static pictures, and the group of pictures is displayed with a predetermined display effect and/or a predetermined display effect corresponding to the second playback model, wherein the predetermined display effect in the second playback model is a progressive transition effect and the predetermined display effect is a slow display speed, and a second type of music corresponding to the second playback model, such as romantic music, is selected and played while the group of pictures is being displayed, as shown in Table 2.

The third playback model is: a picture among of a group of pictures with shutter speed value SV larger than the reference value SL and less than the reference value SH is classified as a third type of pictures, such as general pictures, and the group of pictures is displayed with a predetermined display effect and/or a predetermined display effect corresponding to the third playback model, wherein the predetermined display effect in the third playback model is a general transition effect between the quick and progressive transition effects and the predetermined display effect is an average display speed between the fast and slow display speed, and a third type of music corresponding to the third playback model, such as general music, is selected and played while the group of pictures is being displayed, as shown in Table 2. It is noted that Table 2 is only an example for illustrative purposes only, and is not meant to be a limitation of the present invention. Moreover, a plurality of pictures of the group of pictures may be utilized for determining the playback model for the picture priority mode.

TABLE 2 the playback models in the picture priority mode

| playback model | shutter speed value (SV) | picture classification | display effect | display speed | selected music type |
|---|---|---|---|---|---|
| first | SV > SH | first type of picture (e.g. dynamic) | quick transition | fast | first type of music (e.g. |

TABLE 2-continued the playback models in the picture priority mode

| playback model | shutter speed value (SV) | picture classification | display effect | display speed | selected music type |
|---|---|---|---|---|---|
| second | SV < SL | second type of picture (e.g. static) | progressive transition | slow | rock-and-roll) second type of music (e.g. romantic) |
| third | SL < SV < SH | third type of picture (e.g. general) | general transition | average | third type of music (e.g. general) |

Referring to FIGS. 1 and 4, there are a plurality of audio bitstreams which were previously stored in the memory 10, and one group of pictures which were previously stored in the memory 11. Alternatively the group of pictures may be provided to the processing module 12 from an external device and also stored into the memory 11 (step S41), wherein the audio bitstreams includes a plurality of different types of music. In this embodiment, the processing module 12 performs a read operation to the memory 11 to receive at least one picture in the group of pictures previously stored in the memory 11. The processing module 12 analyzes the received picture to obtain at least one feature value of the picture such as a shutter speed value (step S42). The feature value is provided to the determination module 13. The determination module 13 compares the feature value with at least one reference value stored in the table 130, such as reference values SH and SL (step S43) and determines the type of the analyzed picture such as the first, second and third types of pictures shown in Table 2 according to the comparison result to further determine which one of the three playback models is used for the group of pictures (step S44). The determination module 13 generates indication signals S130 and S131 respectively to the playback controller 140 and the display controller 150 according to the determined playback model. The playback controller 140 selects one corresponding type of music among the different types of music from the memory 10 according to the indication signal S130 (step S45) and plays the selected type of music through the audio output element 141 (step S46). The display controller 150 controls the display element 151 to display the group of pictures read from the memory 11 according to the indication signal S131 to adjust the display effect and/or display speed. While the playback controller 140 is playing the selected type of music through the audio out element 141, the display element 151 displays at least the one picture of the group of pictures with the display effect and the display speed of the determined playback model (step S47).

For example, when the shutter speed value of the analyzed picture is larger than the reference value SH, the determination module 13 determines that the first playback module is used. The playback controller 140 selects the rock-and-roll type of music to be played by the audio output element 141. The display element 151 displays the group of pictures with the quick transition effect and the fast display speed while the rock-and-roll type of music is being played.

According to the embodiment of FIG. 4, when the device 1 operates in the picture priority mode to simultaneously play music and display pictures, the display effect and/or display speed for the pictures matches with the content of the groups of pictures, and a type of music matching with the content of the groups of pictures is selected to be played. Accordingly, the device 1 can play music and display pictures simultaneously according to human emotional feelings without manual operation.

Moreover, assuming that several pictures among one group of picture stored in the memory 11 are processed by the processing module 12 to obtain respective feature values for determination of the playback model. The processing module 12 performs a statistics operation to the feature values to obtain a final feature value, and the determination module 13 determines the playback model to be used according to the final feature value and the reference values.

In the music and picture priority modes, after the determination module 13 determines the playback model to be used to play music and display pictures simultaneously, the display module 15 can modify color temperatures, color hues, contrasts, brightness values, and/or saturation degrees of the pictures according to the determined playback model, so that the contents of the modified pictures further match the played type of music. In some embodiments, after the playback model is determined in the picture priority mode, the music playing module 14 can also modify the bass, treble, or balance of music to be played, so that the type of the modified music further matches the contents of the pictures to be displayed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying multimedia data performed by a multimedia device comprising:
   building a plurality of playback models based on a plurality of emotional feeling responses by the multimedia device;
   providing a plurality of pictures and a plurality of different types of music by a memory;
   analyzing at least one of the pictures to obtain at least one feature value thereof by a processing module;
   determining a playback model from the plurality of playback models to display at least one of the pictures therewith according to the at least one feature value of the at least one picture by a determination module;
   selecting one type of music among the different types of music according to the determined playback model;
   playing the selected type of music by a music playing module; and
   displaying the at least one of the pictures according the determined playback model while the selected type of music is being played by a display module;

wherein the at least one feature value comprises a time when the at least one of the pictures was taken, a shutter speed value of the at least one of the pictures, an aperture value of the at least one of the pictures, and an International Organization for Standardization (ISO) value of the at least one of the pictures.

2. The method as claimed in claim 1, wherein the step of displaying the at least one of the pictures according the determined playback model comprises displaying at least one of the pictures with one of a predetermined display effect, a predetermined display speed and a combination thereof according to the determined playback model.

3. The method as claimed in claim 2, wherein the predetermined display effect is a quick transition effect, a progressive transition effect, or a general transition effect and the predetermined display speed is a fast, slow, or average display speed.

4. The method as claimed in claim 1, wherein the step of building the playback models comprises:
  collecting the plurality of emotional feeling responses to a plurality of model pictures;
  analyzing each of the model pictures to obtain at least one feature value thereof;
  comparing the at least one feature value of each of the model pictures with at least one reference value; and
  building the playback models according to the plurality of emotional feeling responses and the comparison results.

5. The method as claimed in claim 1, wherein the type is a rock-and-roll, romantic or general type.

6. The method as claimed in claim 1, wherein the plurality of model pictures depict different content, wherein the content comprises one of dynamic content and static content.

7. A device for displaying multimedia data according to a plurality of playback models, comprising:
  a first memory for storing a plurality of audio bitstreams;
  a second memory for storing a group of pictures;
  a processing module for receiving and analyzing one of the audio bitstreams in a music priority mode or at least one picture of the group of pictures in a picture priority mode to generate at least one feature value;
  a determination module for receiving the at least one feature value, determining one of the playback models to play the analyzed audio bitstream in the music priority mode therewith or display the analyzed picture in the picture priority mode therewith according to the at least one feature value, and generating a first indication signal and a second indication signal according to the determined playback model;
  a music playing module for playing the one of the audio bitstreams in the music priority mode according to the first indication signal or one type of the audio bitstreams in the picture priority mode according to the first indication signal; and
  a display module for displaying the group of pictures in the music priority mode according to the second indication signal or displaying the at least one picture of the group of pictures in the picture priority mode according to the second indication signal;
  wherein the at least one feature value in the picture priority mode comprises a time when the at least one of the pictures was taken, a shutter speed value of the at least one of the pictures, an aperture value of the at least one of the pictures, and an International Organization for Standardization (ISO) value of the at least one of the pictures.

8. The device as claimed in claim 7, wherein the display module displays pictures with one of a predetermined display effect, a predetermined display speed and a combination thereof according to the second indication signal.

9. The device as claimed in claim 8, wherein the predetermined display effect is a quick transition effect, a progressive transition effect, or a general transition effect and the predetermined display speed is a fast, slow, or average display speed.

10. The device as claimed in claim 7, wherein the at least one feature value in the music priority mode comprises at least one of frequency variation value and volume variation value of the analyzed audio bitstream.

11. The device as claimed in claim 7, wherein the at least one feature value in the picture priority mode comprises at least one of a time when the analyzed picture was taken, a shutter speed value of the analyzed picture, an aperture value of the analyzed picture, and an International Organization for Standardization (ISO) value of the analyzed picture.

12. The device as claimed in claim 7, wherein the type is a rock-and-roll, romantic or general type.

* * * * *